Sept. 20, 1966 H. B. WOLF 3,274,445
METHOD AND MEANS FOR INCREASING VOLTAGE CAPABILITY
AND IMPROVING THE OPERATION OF AN ELECTRICAL
TRANSMISSION SYSTEM
Filed July 25, 1963 2 Sheets-Sheet 1

INVENTOR.
HERMAN B. WOLF
BY
Eaton, Bell, Hunt & Seltzer
ATTORNEYS

INVENTOR.
HERMAN B. WOLF
BY
Eaton, Bell, Hunt & Seltzer
ATTORNEYS

United States Patent Office 3,274,445
Patented Sept. 20, 1966

3,274,445
METHOD AND MEANS FOR INCREASING VOLTAGE CAPABILITY AND IMPROVING THE OPERATION OF AN ELECTRICAL TRANSMISSION SYSTEM
Herman B. Wolf, Charlotte, N.C., assignor to R. H. Bouligny, Inc., Charlotte, N.C., a corporation of North Carolina
Filed July 25, 1963, Ser. No. 297,560
13 Claims. (Cl. 317—12)

The present invention relates to electrical power systems and more particularly to an electrical power transmission system which includes a plurality of power transmission lines connected as a transmission network to sources of electrical energy and to loads.

Electrical transmission systems have experienced very rapid growth in the past and there is every indication that this growth will continue and that the already large loads connected to exising transmission systems will increase beyond the voltage capabilties of the systems. Many of such transmission systems already have very great capacity and it is usual practice to have large transmission interconnections between transmission systems so that some of the capacity of some of the interconnected systems is made available to other systems connected thereto.

The very large loads connected to such transmission systems and the interconnecting of many transmission systems have resulted in very serious problems. One such problem arises since, as stated above, the load requirements for a transmission system frequently increase and require that increased voltage beyond the voltage capability of the transmission lines be provided therefor. Hence, transmission lines having an increased voltage capability are required. Heretofore, such transmission lines of increased voltage capability could only be provided by new and larger transmission structures, insulators, etc,. and wider right-of-way, all of which result in a greatly increased labor cost and capital expenditure.

In this regard, a transmission system for a given normal operating voltage capability is constructed in such a manner that the transmission lines have a basic insulation level which may be described as the maximum voltage which may be impressed thereon without too many or too frequent faults, such as short circuits from phase to phase and flash-overs from line to ground. Usually, the basic insulation level is many times the normal operating voltage to give a large safety factor because of the adverse effects of such faults in the transmission line or lines.

The basic insulation level for a transmission line is determined by the size of conductors, the spacing between adjacent conductors, the spacing between the conductors and ground, and the type, size and number of insulators used. For example, a conventional transmission line having a normal operating voltage capability of 132 kilovolts should have a basic insulation level of approximately 700 kilovolts to provide the required fault safety factor. This basic insulation level is provided by conductors of at least 2/0 size, 12 to 14 feet spacing between adjacent conductors, 5 to 6 feet spacing between the conductors and ground, and from 7 to 9 5¾ inch suspension type, porcelain insulators for each conductor.

Conventionally, if the normal operating voltage capability of such transmission lines were required to be increased from 132 kilovolts to 230 kilovolts, for example, by an increased load on the transmission system, the basic insulation level would also have to be increased accordingly or too frequent faults would occur. To achieve this increased basic insulation level, new transmission lines would have to be constructed to provide a basic insulation level of about 1,400 kilovolts and such a basic insulation level would be provided by conductors of at least 1108 mills in diameter (795 m.c.m.) and, preferably, ACSR (Aluminum Cable, Steel Reinforced) type, a spacing of from 20 to 30 feet between adjacent conductors, a spacing of from 8 to 12 feet between the conductors and ground, and from 15 to 18 5¾ inch suspension type, porcelain insulators per conductor. It can readily be appreciated that the cost of such new transmission lines would be very high due to the increased cost of materials, labor and wider rights-of-way. In fact, the cost of constructing a conventional transmission system having a 230 kilovolt capability is about $50,000 per mile more than the cost of constructing a conventional transmission system having a 132 kilovolt capability.

Another serious problem encountered with conventional transmission systems is that the great capacity of the transmission systems, the interconnections with other transmission systems, the higher voltage, and large transmission lines cause excessive current to flow in one or more of the transmission lines when a fault occurs therein. Such a flow of excessive fault current may overstress circuit breakers and other apparatus connected in the transmission lines and may also cause an undesirable voltage dip over a portion or all of the transmission system and, under certain conditions, may cause a condition of instability between portions of a transmission system or between transmission systems.

It is therefore an object of the present invention to provide a novel means for increasing the permissible normal operating voltage which may be impressed on power transmission lines without the necessity of increasing the basic insulation level thereof to thus reduce the cost of construction of new transmission lines and to obviate major modification of existing transmission lines due to increased loads.

A more specific object of this invention is to provide a novel transmission system of a given basic insulation level capable of having an increased normal operating voltage impressed thereon and wherein the adverse effects of flash-overs or faults are negated.

A still more specific object of the present invention is to provide novel means for increasing the permissible normal operating voltage impressible on transmission lines and for improving the operation of a transmission system wherein series capacitors are provided for offsetting the reactance of the transmission lines during normal operating voltage and current conditions therein and wherein the fault current flowing in the transmission circuits upon the occurrence of a fault is limited to a predetermined safe value.

A further more specific object of the present invention is to provide a novel protective means for capacitors connected in a transmission line or the like for preventing damage thereto due to excessive voltage upon the occurrence of a fault in the transmission line.

Some of the objects of the invention having been stated, other objects will appear as the description proceeds, when taken in connection with the accompanying drawings, in which—

Figure 1:
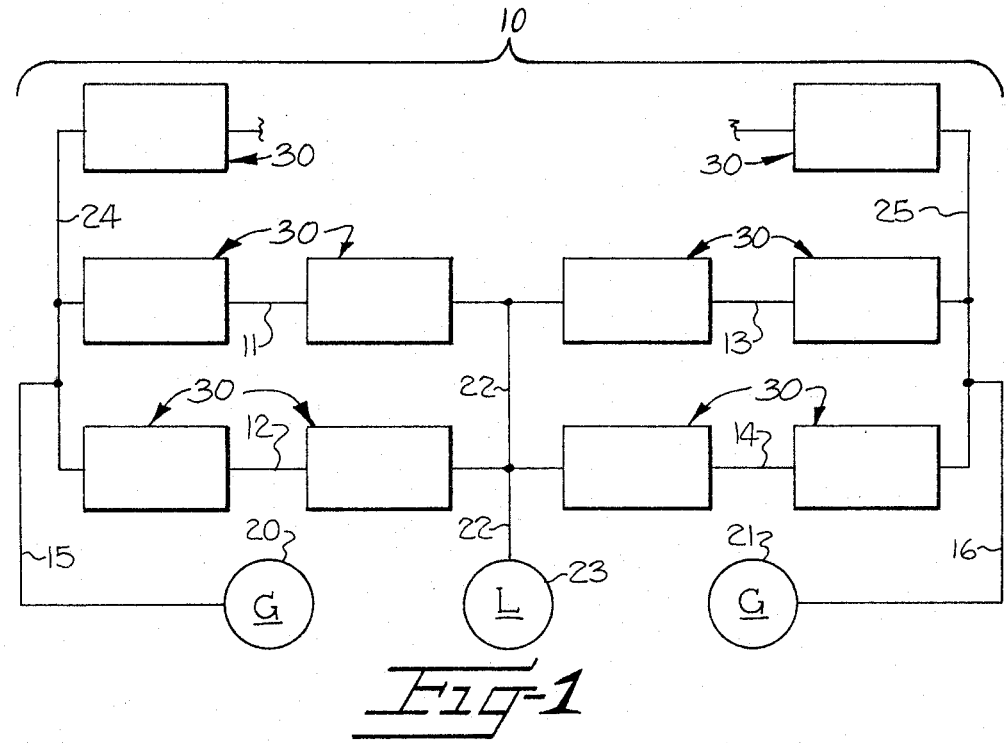
FIGURE 1 is a schematic view illustrating a typical power transmission system including the features of the present invention.

Referring now to the drawings and more particularly to FIGURE 1 thereof, there is shown a transmission system 10 and including a plurality of transmission lines 11, 12, 13 and 14 connected by lines 15, 16 to sources of electrical energy 20, 21 which may be of any suitable character such as generators or the like. Transmission lines 11, 12, 13 and 14 are connected by a line 22 to a suitable load or loads 23. Transmission lines 11–14 are therefore connected as a transmission network and additional transmission lines 24, 25 may be connected to transmission lines 11 and 13, for example, to interconnect transmission system 10 with other transmission lines or other transmission systems. While the transmission lines 11–14, 24 and 25 are illustrated schematically in the drawings by a single line, it should be understood that the same may be single phase but are usually of polyphase construction.

Connected in each of the transmission lines 11, 12, 13, 14, 24 and 25 and at each end or terminal thereof is means generally indicated at 30 for increasing the permissible normal operating voltage impressible on the transmission lines 11–14, 24 and 25 without the necessity of increasing the basic insulation level thereof. Means 30 (FIGURE 2) includes a set of capacitors 31 comprising a plurality of capacitors 32 which are connected in parallel to each other by lines 33 and the set of capacitors 31 is connected in line 11, for example, in series with the load 23. It is noted that the capacitors will be of a number and size dependent upon the maximum operating load expected to be impressed upon the transmission lines plus a suitable safety factor. A current limiting reactor 34 is connected in transmission line 11 in series with the set of capacitors 31 and preferably has an inductive reactance no greater than the capacity reactance of the set of capacitors 31 in series therewith. Therefore, during normal operating voltage conditions in transmission line 11, the inductive reactance of reactor 34 is offset by the capacitive reactance of the set of capacitors 31 so that a voltage drop across the combination of reactor 34 and capacitors 31 is prevented under normal conditions.

A circuit breaker 35 is connected in line 11 in series with the set of capacitors 31 and reactor 34. Circuit breaker 35 is of the conventional type having a substantially instantaneous reclosing relay (not shown) associated therewith and also a back-up and lock-out relay (also not shown) associated therewith for reasons to become presently apparent. Means for protecting the set of capacitors 31 from damage due to a damaging voltage increase thereacross because of the occurrence of a fault in transmission line 11 is generally indicated at 40 and includes a line 41 connected at one end to transmission line 11 between the set of capacitors 31 and reactor 34 and connected at its other end to one side of the primary winding 42a of a current transformer 42, the secondary winding 42b of which is connected by lines 43, 44 to circuit breaker 35. A line 45 is connected at one end to the other side of primary winding 42a and is connected at its other end to one side of a second reactor 46. The other side of reactor 46 is connected by a line 47 to one side of an arc gap protecting device 50 which includes a first electrode 51 to which line 47 is connected and a second electrode 52 which is disposed in upwardly diverging relation with first electrode 51 to define an arc chute therebetween. First and second electrodes 51, 52 have the lower portions thereof disposed a predetermined distance apart to define a calibrated arc gap therebetween across which an arc will be established upon a predetermined voltage rise thereacross and first electrode 51 extends upwardly beyond the upper end of second electrode 52 for a predetermined distance.

An arc driving coil 53 (schematically shown in FIGURE 2) has one side thereof connected to second electrode 52 by a line 54 and has the turns thereof disposed relative to the lower portion of first and second electrodes 51, 52 in conventional manner (not shown) such that upon current flow therein in response to an arc being established across the arc gap, the magnetic field around such turns of coil 53 will coact with the magnetic field around the arc to drive or move the arc upwardly in the arc chute at a very rapid rate. The other side of arc driving coil 53 is connected by a line 55 to an arc restraining coil 56 (also shown schematically in FIGURE 2) which has the turns thereof disposed relative to the lower portion of electrodes 51, 52 such that the magnetic field therearound upon current flow therein will coact with the magnetic field of the arc to prevent lateral elongation of the arc out of the arc chute. The positional relationship of arc driving coil 53, arc restraining coil 56 and electrodes 51, 52 is specifically disclosed in applicant's copending application entitled, Protecting Device for Series Capacitor Circuits, Serial No. 254,626, filed January 29, 1963, to which attention is directed for a more detailed disclosure thereof.

The other side of arc restraining coil 56 is connected by a line 57 to one side of a resistor 60. The other side of resistor 60 is connected by a line 61 to transmission line 11 on the opposite side of the set of capacitors 31 from reactor 34.

A third electrode 62 is disposed on the opposite side of second electrode 52 from first electrode 51 and extends above second electrode 52 substantially the same distance as first electrode 51. Therefore, the space between first electrode 51 and third electrode 62 defines a widened upward extension of the arc chute between first electrode 51 and second electrode 52. Hence, considerably more resistance is provided to the arc after the same has moved upwardly out of the arc chute between first and second electrodes 51, 52 and into the space between first and third electrodes 51, 62. Third electrode 62 is connected by a line 63 to line 61 in shunting relation to arc driving coil 53, arc restraining coil 56 and resistor 60.

An arc cooling and quenching device 64 is disposed above first and third electrodes 51, 62 and comprises a plurality of plates 65, 66, which may be all of a fibrous material, but which are preferably fibrous and metallic plates disposed in alternation. Such an arc quenching device is also specifically disclosed and described in the aforementioned copending application.

The operation of each of means 30 for increasing the permissible normal operating voltage impressible on the transmission lines will now be described. Under normal operating voltage and current conditions or normal load periods in the transmission line 11, for example, the protective means 40 in shunting relation to the set of capacitors 31 remains inoperative due to the protective arc gap between electrodes 51, 52 and current flows through the set of capacitors 31, current limiting reactor 34 and circuit breaker 35. Since the inductive reactance of current limiting reactor 34 is no greater than and, preferably less than, the capacitive reactance of the set of capacitors 31, such inductive reactance is offset by the capacitive reactance and no undesirable voltage drop across the combination of the current limiting reactor 34 and capacitors 31 occurs.

Upon the occurrence of a fault in the transmission line 11, fault current in excess of the normal operating current will flow therein and a voltage increase will occur across the set of capacitors 31 which voltage increase will frequently exceed the voltage capacity of the capacitors 32 and will damage the same unless protected. When this voltage increase reaches a predetermined value, which predetermined value is below the voltage capacity of the capacitors, the protective arc gap between first and second electrodes 51 and 52 breaks down and an arc becomes established thereacross which will complete the shunting circuit across the set of capacitors 31.

Upon the establishment of the arc, arc driving coil 53 coacts therewith to move the arc upwardly in the arc chute while arc restraining coil 56 prevents lateral elongation of the arc out of the chute. At the same time, energy dissipating resistor 60 dissipates any energy stored in the set of capacitors 31 and second reactor 46 impresses an inductive reactance on the current flowing through the shunting circuit to limit the fault current through the arc gap circuit. When the arc moves to the upper end of the arc chute, the same will transfer from second electrode 52 to third electrode 62 shunting arc driving coil 53, arc restraining coil 56 and resistor 60 and will elongate upwardly between first and third electrodes 51 and 62 where the same will be cooled by the arc cooling and quenching device 64. It is noted that this upward elongation of the arc between first and third electrodes 51 and 62 increases the resistance to the flow of current through the protective gap shunting circuit.

When the set of capacitors 31 is shunted upon the establishment of an arc across the arc gap, the inductive reactance of the current limiting reactor 34 is no longer offset by the capacitive reactance of the capacitors and substantially all of this inductive reactance opposes the fault current and combines with the reactance of the second reactor 46 to limit the fault current flowing in the transmission line 11 to a predetermined safe value. Current transformer 42 senses current flow in the protective gap circuit or protecting means 40 and actuates circuit breaker 35 to open transmission line 11 to remove the fault therefrom. Circuit breaker 35 will be substantially instantaneously reclosed by reclosing relay means associated therewith and, if the fault has been removed, normal voltage and operating conditions will again be present in transmission line 11. If the fault has not been removed, a voltage increase across the set of capacitors 31 again results and an arc will again be established and the fault current will be limited in the manner discussed above until circuit breaker 35 is again opened and held open by back-up and lock-out relay means associated therewith until manually reclosed.

Figure 3:
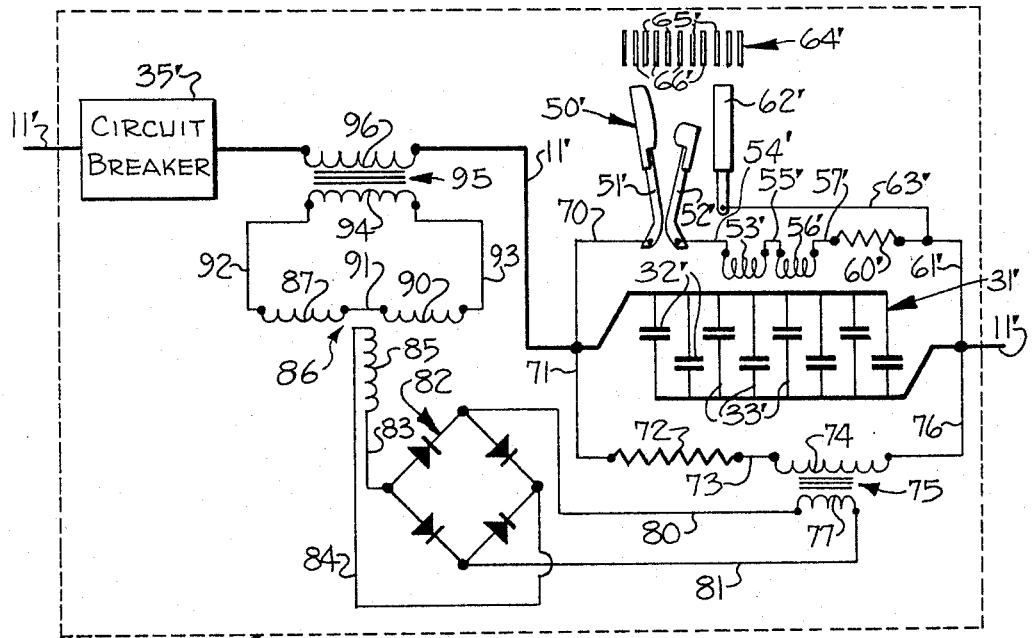
FIGURE 3 is a view similar to FIGURE 2 of a modified form of this structure.

Referring now to FIGURE 3 wherein a modified form of the means for increasing the permissible normal operating voltage impressible on the transmission lines is shown and wherein like reference characters with the prime notation added will be used to indicate like elements, transmission line 11' has a set of capacitors 31' connected therein. A circuit breaker 35' is connected in transmission line 11' in series with the set of capacitors 31' and is of conventional type which will open to interrupt transmission line 11' upon a predetermined increase in current flowing therethrough and will substantially instantaneously reclose after opening and has suitable back-up and lock-out relay means as is conventional.

An arc gap protecting device 50' has first electrode 51' thereof connected to transmission line 11' by a line 70 on one side of the set of series capacitors 31'. Second electrode 52' thereof is connected in series with an arc driving coil 53', an arc restraining coil 56' and an energy dissipating resistor 60' by lines 54', 55' and 57'. Resistor 60' is connected to transmission line 11' on the opposite side of the set of capacitors 31' from line 70 by a line 61'. Third electrode 62' is connected in shunting relation to arc driving coil 53', arc restraining coil 56' and resistor 60' by a line 63' and arc quenching and cooling device 64' is disposed above first and second electrodes 51' and 62'.

A line 71 is connected at one end to transmission line 11' on the same side of the set of capacitors 31' as line 70 and is connected at its other end to a damping resistor 72. Resistor 72 is connected by a line 73 to one side of primary winding 74 of a transformer 75. The opposite side of primary winding 74 is connected by a line 76 to transmission line 11' on the opposite side of the set of capacitors 31' from line 71.

Transformer 75 is preferably of the iron core type and has a secondary winding 77, opposite sides of which are connected by lines 80, 81 to the input terminals of a bridge rectifier 82. Bridge rectifier 82 is of conventional construction and is a full wave rectifier which converts the alternating current applied to the input sides thereof to direct current. The output terminals of bridge recifier 82 are connected by lines 83, 84 to opposite sides of a D.C. winding 85 of a saturable reactor 86 having A.C. windings 87, 90 conventionally arranged with D.C. winding 85. A.C. windings 87, 90 are interconnected by a line 91 and are connected by lines 92, 93 across secondary winding 94 of a transformer 95 having a primary winding 96 connected in transmission line 11' between circuit breaker 35' and the points of connection of lines 70, 71 to transmission line 11'.

Figure 2:
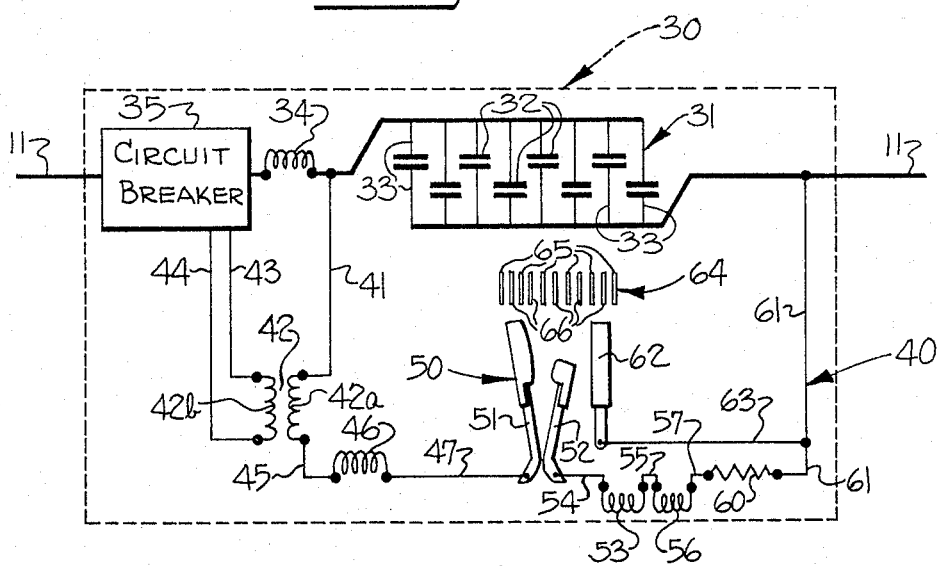
FIGURE 2 is an enlarged schematic view illustrating the structure for increasing the permissable normal operating voltage which may be impressed on transmission lines, which structure is represented by each of the rectangular blocks in FIGURE 1.

In operation, portions of the embodiments shown in FIGURE 3 operate the same as the embodiment shown in FIGURE 2 and therefore only the differences in the operation of this embodiment will be now described. Under normal voltage and current operating conditions in transmission line 11', circuit breaker 35' will be closed and the current will be flowing in transmission line 11' and through the set of capacitors 31'. The arc gap defined by first and second electrodes 51', 52' maintains the protective gap circuit or protective means 40' open such that no current will flow therethrough.

However, current does flow through damping resistor 72 and winding 74 of transformer 75. Upon such current flow, current flows to bridge rectifier 82, through secondary winding 77 of transformer 75 and lines 80, 81. Bridge rectifier 82 converts the alternating current voltage supplied thereto to direct current voltage which is impressed upon D.C. winding 85 of saturable reactor 86 and serves to saturate the saturable reactor 86. When fully saturated, reactor 86 effectively short circuits secondary winding 94 of the transformer 95. Therefore, the voltage drop across primary winding 96 of transformer 95 is negligible and is offset by the capacitive reactance of the set of capacitors 31'. During periods of very light load on transmission line 11', the current flowing through capacitors 31' will be reduced to a small value and hence the voltage across capacitors 31' and transformer 75 will be low. This low voltage will reduce the degree of saturation in saturable reactor 86 which will have the effect of increasing the voltage across transformer 95. This voltage increase across transformer 95 reduces the voltage on transmission line 11' and therefore reduces or "bucks" the line voltage during light load periods and increases or "boosts" line voltage during heavy load periods in addition to limiting fault current during periods of fault as described below.

Upon the occurrence of a fault in transmission line 11', increased fault current will flow therein and will cause a voltage increase across the set of capacitors 31'. An arc will be established between electrodes 51', 52' and will behave in the same manner as described above.

Upon the establishment of the arc between electrodes 51, 52', damping resistor 72 and primary winding 74 of transformer 75 are shunted by the protective arc gap circuit and the current flowing therein is quickly reduced to zero. Therefore, no voltage is impressed upon the ridge rectifier 82 and, hence, no voltage is impressed upon the D.C. winding 85 of the saturable reactor 86. When this occurs, saturable reactor 86 becomes unsaturated very rapidly and impresses an inductive reactance load across secondary winding 94 of transformer 95. Therefore, a load is impressed on primary winding 96 of transformer 95 and the iron core thereof rapidly becomes saturated so that primary winding 96 of transformer 95 becomes in effect an air core reactor. An inductive reactance is therefore impressed upon transmission line 11' which limits the fault current flowing in the transmission line 11' to a predetermined safe value until circuit breaker 35' can act to open the transmission line 11' to remove the fault therefrom. Upon reclosure of circuit breaker 35′, normal voltage and current operating conditions will again be present in transmission line 11′.

Figure 4:
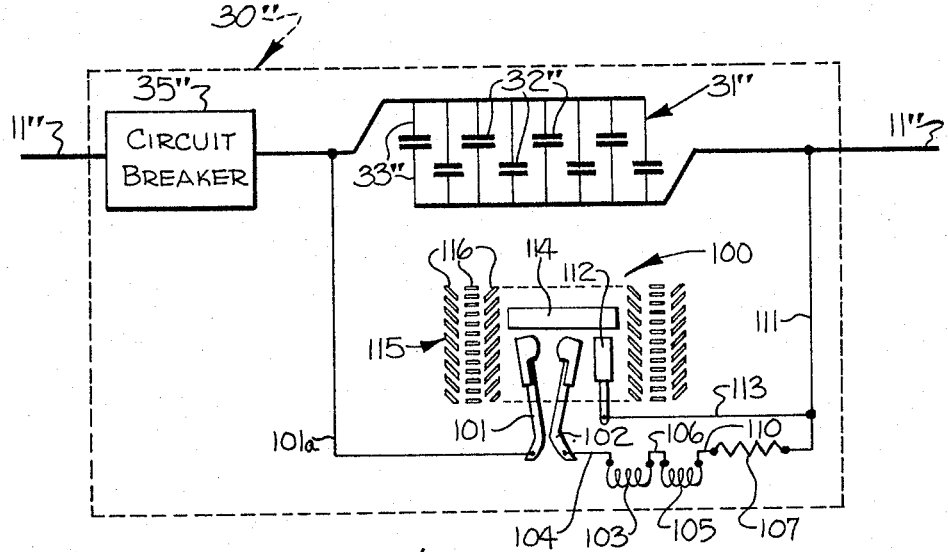
FIGURE 4 is a view similar to FIGURE 2 of a modified form of a protective device for capacitors.

Referring now to FIGURE 4, wherein another embodiment of a protecting device for series capacitors is shown and wherein like reference characters with the double prime notation added are used to indicate like elements, a transmission line 11″ has a set of capacitors 31″ and a circuit breaker 35″ connected in series therein. A protecting device for the set of capacitors 31″ is generally indicated at 100 and includes a first electrode 101 which is connected by a line 101a to transmission line 11″ between the set of capacitors 31″ and circuit breaker 35″. A second electrode 102 is mounted adjacent electrode 101 and is disposed in upwardly diverging relation thereto to define an arc chute therebetween. The lower end portions of the electrodes 101 and 102 are disposed a predetermined distance apart to define a calibrated arc gap across which an arc will be established upon a predetermined voltage increase thereacross.

An arc driving coil 103 is connected in series with second electrode 102 by a line 104 and an arc restraining coil 105 is connected in series with an arc driving coil 103 by a line 106. Arc driving coil 103 and arc restraining coil 105 are disposed relative to the lower portions of electrodes 101 and 102 in the manner set forth above. An energy dissipating resistor 107 is connected in series with arc restraining coil 105 by a line 110 and is connected by a line 111 to transmission line 11″ on the opposite side of the set of capacitors 31″ from line 102.

A third electrode 112 is disposed on the opposite side of second electrode 102 from first electrode 101 and is disposed a predetermined distance therefrom. Third electrode 112 is connected by a line 113 to line 111 in shunting relation to arc driving coil 103, arc restraining coil 105 and energy dissipating resistor 107. An elongate fourth electrode 114 is disposed above first, second and third electrodes 101, 102 and 112 and extends from overlying relation to first electrode 101 into overlying relation to third electrode 112.

An arc cooling and quenching device 115 is disposed in surrounding relation to the upper portions of electrodes 101, 102, 112 and 114 and includes a plurality of fiber plates 116 which are of the louvre type. Plates 116 have spaced apart portions defining openings therethrough at various angles to permit the flames and hot gases from an arc existing between the electrodes to pass therethrough and to be cooled thereby.

It is noted that the protecting device 100 is particularly adapted for use in the protection of a set of capacitors 31″ wherein the voltage conditions existing in transmission line 11″ are relatively low and there is no necessity for limiting the fault current flowing in the transmission line upon the occurrence of a fault. However, the existence of fault current in the transmission line 11″ would have a deleterious effect upon the set of capacitors 31″ in the absence of such protecting device.

In operation, under normal operating voltage and current conditions, the protective arc gap defined by first and second electrodes 101 and 102 maintains the shunting circuit open such that current flows through the set of series capacitors 31″. Upon the occurrence of a fault in transmission line 11″, the fault current will cause a voltage increase across the set of capacitors 31″ which will result in the break down of the protective arc gap and the establishment of an arc thereacross.

Upon the establishment of an arc between first and second electrodes 101, 102, arc driving coil 103 coacts therewith to move the arc upwardly in the arc chute between these electrodes, and arc restraining coil 105 coacts therewith to prevent lateral elongation of the arc out of the arc chute. At the same time, energy dissipating resistor 107 impresses a resistance on the shunting circuit to dissipate any energy stored in the set of capacitors 31″.

Upon movement of the arc to the upper ends of first and second electrodes 101, 102, the arc will travel from first electrode 101 up to fourth electrode 114 and through fourth electrode 114 downwardly to third electrode 112. This shunts second electrode 102, arc driving coil 103, arc restraining coil 105 and energy dissipating resistor 107 from the protective arc gap circuit. Therefore, a low resistance shunting circuit is provided around the set of capacitors 31″ to limit the voltage increase thereacross to a low value. In this regard, it is noted that fourth electrode 114 prevents upward elongation of the arc and therefore maintains the resistance of the arc path at a low value.

The operation of the system 10 will now be described and particularly the manner in which means 30 cooperate for increasing the permissible normal operating voltage which may be impressed on transmission lines 11, 12, 13 and 14. For purposes of describing the operation of system 10 and not by way of limitation, assume that generators 20 and 21 impress a transmission voltage of 230 kilovolts on transmission lines 11, 12, 13 and 14, each of which has a nominal maximum current rating of 600 amps. The load 23 is 1200 amps and will be supplied equally by transmission lines 11, 12, 13 and 14 under normal operating conditions with each line supplying 300 amps. Under such a transmission set up, the fault current which would flow in a faulted transmission line would be 2000 amps.

Now, assume that a fault occurs in transmission line 11 between the ends thereof and means 30 connected therein. Then, 2000 amps of fault current will flow into transmission line 11 from each end through the means 30 connected therein and transmission lines 12, 13 and 14 will each supply 666 amps of this fault current to one end of transmission line 11. Since no power will flow to the load 23 through the faulted transmission line 11, the load must be supplied through the remaining lines 12, 13 and 14 and each transmission line will therefore supply a load current of 400 amps to the load. Hence, during the period in which fault current is flowing in transmission line 11, a total load of 1066 amps is impressed on each of the transmission lines 12, 13 and 14.

When the fault occurs in transmission line 11, a voltage increase occurs across the set of capacitors 31 at each end of the transmission lines 12, 13 and 14 due to the increased load current flowing therein and this voltage increase substantially instantaneously compensates for any voltage drop in the circuits occasioned by the higher current flowing therein. Therefore, the voltage at load 23 is normal during the time the fault in transmission line 11 exists and hence, there is no detectable adverse effect on service to load 23.

The fault current flowing in transmission line 11 or 11′ during the existence of the fault is limited by reactors 34 and 46 or by the transformer 95 and its associated saturable reactor 86. Also, the sets of capacitors 31 or 31′ in transmission line 11 or 11′ are protected by protective devices 50 or 50′ connected in shunting relation thereto from damage due to the increased voltage occasioned by the increased fault current.

When circuit breakers 35 or 35′ at each end of transmission line 11 or 11′ open thereby removing the fault from the system, the current flowing in each of the transmission lines 12, 13 and 14 will then be 400 amps. When circuit breakers 35 or 35′ substantially instantaneously reclose, the normal operating voltage and current conditions in all of the transmission lines 11, 12, 13 and 14 will again exist.

It will therefore be apparent that a novel method and means for increasing voltage capability and improving the operation of an electrical transmission system is provided wherein the fault current flowing in a faulted transmission line in the system is limited to a predetermined safe value which eliminates overstressing of circuit breakers and other equipment; the instantaneous and automatic response of the capacitors in the unfaulted circuits largely decreases or entirely eliminates any voltage dip in the system occasioned by the fault and therefore the capacitors help to maintain correct voltage over the system in the event of an outage of one or more of the transmission lines; and the permissible normal operating voltage which may be impressed on the transmission lines is increased due to the offsetting of the inductive reactance of the lines by the capacitive reactance of the series capacitors, the obviation of any instability as a result of a fault due to the limiting of the fault current to a safe value, and since the occurrence of a fault would have no adverse effect on service to a load or loads. Hence, in a transmission line, the ratio between operating voltage to ground and the basic insulation level may be safely decreased so that, for example, the operating voltage of a 132 kilovolt line may be increased to 230 kilovolts. There is also provided novel means for protecting a set of capacitors connected in a transmission line or the like from damage due to over-voltage because of increased current caused by a fault in the line.

In the drawings and specification there have been set forth preferred embodiments of the invention and, although specific terms are employed, they are used in a generic and descriptive sense only and not for purposes of limitation, the scope of the invention being defined in the claims.

I claim:

1. In an electrical transmission system having a plurality of transmission lines connected as a transmission network to sources of electrical energy and to loads, said transmission lines having a given basic insulation level which prevents frequent faults therein at a given normal operating voltage; the improvement comprising means for increasing the permissible normal operating voltage impressible on said transmission lines without the necessity of increasing the basic insulation level thereof and for improving the operation of the transmission system comprising (a) a set of capacitors connected in each of said transmission lines at each end thereof, said capacitors serving to substantially offset reactance of the transmission lines and to substantially eliminate voltage dip occasioned by a fault,
   (b) protective means connected in shunting relation to each of said sets of capacitors and normally being inoperative upon normal voltage and current conditions in said transmission lines, but being operable in response to a predetermined voltage rise across said capacitors due to the occurrence of a fault in the transmission line for shunting said capacitors to protect the same from damage, due to excessive voltage,
   (c) current limiting means connected in said transmission lines in series with each of said sets of capacitors and having an ohmic value no greater than the ohmic value of the capacitive reactance of said set of capacitors in series therewith so that said capacitors render said current limiting means ineffective during normal operating current conditions, said current limiting means becoming effective upon the shunting of the capacitors by said protective means for limiting the current flowing in the faulted circuit to a predetermined value, and
   (d) circuit breaking means connected in said transmission lines at each end thereof and in series with each of said sets of capacitors for interrupting the faulted circuit in response to fault current flowing in said transmission lines.

2. The structure set forth in claim 1 wherein said current limiting means (c) comprises a current limiting reactor connected in series to each of said sets of capacitors.

3. The structure set forth in claim 1 wherein said current limiting means (c) comprises (1) a transformer having a primary winding connected in each of said transmission lines in series to each of said sets of capacitors and a secondary winding, and
   (2) a saturable reactor connected across said secondary winding of each of said transformers, said reactors being connected to said transmission lines in parallel to said protective means and being fully saturated during normal load periods in said transmission lines and being partially saturated during light load periods in said transmission lines such that said transformers impress a small inductive reactance on said transmission lines during said normal load periods, but impress a considerable inductive reactance on said transmission lines during said light load periods, said reactors being shunted by said protective means and becoming unsaturated upon the occurrence of a fault in the transmission lines to impress a load on said transformers so that, regardless of the degree of alternating current saturation of said transformers, the same impress an increased inductive reactance on said transmission lines to limit current flowing therein to a predetermined value during periods of fault.

4. The structure set forth in claim 1 wherein said protective means (b) includes
   (1) resistance means for initially impressing a resistance in the shunt across the capacitors for dissipating any energy stored in the series capacitors and the transmission system, and
   (2) means operable in timed relation to the establishment of the shunt across the capacitors for removing said resistance means from the shunt for providing a low resistance shunt across the capacitors to thereby limit the voltage thereacross after the energy stored therein has been dissipated.

5. In an electrical transmission system having a plurality of transmission lines connected as a transmission network to sources of electrical energy and to loads, said transmission lines having a given basic insulation level which prevents frequent faults therein at a given normal operating voltage; the improvement comprising means for increasing the permissible normal operating voltage impressible on said transmission lines without the necessity of increasing the basic insulation level thereof and for improving the operation of the transmission system comprising (a) a set of capacitors connected in each of said transmission lines at each end thereof, said capacitors serving to substantially offset reactance of the transmission lines and to substantially eliminate voltage dip occasioned by a fault,
   (b) protective means connected in shunting relation to each of said sets of capacitors and including
      (1) means defining a vertically disposed, elongate arc chute having an arc gap at its lower end which is calibrated to prevent the establishment of an arc thereacross during normal operating voltage conditions, but permitting an arc to be established thereacross in response to a predetermined voltage rise across said arc gap, the arc moving upwardly in the arc chute from the arc gap,
      (2) resistance means connected in series with said arc chute defining means for initially dissipating energy stored in the capacitors and the transmission system upon the establishment of an arc across said arc gap, and
      (3) means disposed adjacent the upper portion of said arc chute for receipt of the arc therefrom when the arc moves to the upper portion of the arc chute and being connected in shunting relation to said resistance means for removing said resistance means from the shunt across the capacitors for providing a low resistance shunt across the capacitors to thereby limit the voltage theracross after the stored energy has been dissipated, (c) a current limiting reactor connected in said transmission lines in series with each of said sets of capacitors and having an inductive reactance no greater than the capacitive reactance of said set of capacitors in series therewith so that the inductive reactance of said reactor is offset by the capacitive reactance of said capacitors during normal operating current conditions, said reactor being operable in response to the shunting of said capacitors by the establishment of an arc across said arc gap for limiting the current flowing in the faulted transmission line to a predetermined value, and (d) circuit breaking means connected in said transmission lines and connected to each of said protective means for interrupting the faulted circuit in response to current flow through said protective means.

6. The structure recited in claim 5 wherein said protective means (b) includes (4) a second reactor connected in series with said arc chute defining means and operable upon the establishment of an arc across said arc gap for limiting current flow across said arc chute and for impressing additional reactance on said transmission line in series with said current limiting reactor for further limiting the current flowing in the faulted transmission line.

7. The structure as set forth in claim 5 wherein said arc chute defining means (b) (1) comprises first and second spaced apart, upwardly diverging elongate electrodes having the lower portions thereof disposed a predetermined distance apart to define said calibrated arc gap, said first electrode being longer than said second electrode and extending upwardly above the upper end of said second electrode, wherein said resistance means is connected in series with said second electrode on the opposite side thereof from said first electrode, and wherein said resistance shunting means (b) (3) comprises a third electrode disposed on the opposite side of said second electrode from said first electrode and extending upwardly above said second electrode for receipt of an arc from said first electrode when the arc has moved upwardly in said arc chute to the upper end of said second electrode, said third electrode being connected in shunting relation to said second electrode and said resistance means for shunting said second electrode and said resistance mean from the shunt across said capacitors when the arc is received thereby from said first electrode.

8. In an electrical transmission system having a plurality of transmission lines connected as a transmission network to sources of electrical energy and to loads, said transmission lines having a given basic insulation level which prevents frequent faults therein at a given normal operating voltage; the improvement comprising means for increasing the permissible normal operating voltage impressible on said transmission lines without the necessity of increasing the basic insulation level thereof and for improving the operation of the transmission system comprising (a) a set of capacitors connected in each of said transmission lines at each end thereof, said capacitors serving to substantially offset reactance of the transmission lines and to substantially eliminate voltage dip due to a fault, (b) protective means connected in shunting relation to each of said sets of capacitors and including (1) first and second elongated, spaced apart, upwardly diverging electrodes defining an arc chute therebetween and having the lower portions thereof disposed a predetermined distance apart to define a calibrated arc gap at the lower end of said arc chute which prevents the establishment of an arc thereacross during normal operating voltage conditions but permits an arc to be established in response to a predetermined voltage rise across said arc gap, said first electrode being longer than said second electrode and extending upwardly beyond the upper end of said second electrode, (2) an energy dissipating resistor connected in series with said second electrode on the opposite side thereof from said first electrode for initially dissipating energy stored in the capacitors and the transmission system upon the establishment of an arc across said arc gap, (3) a third electrode disposed on the opposite side of said second electrode from said first electrode and extending upwardly beyond the upper end of said second electrode and adapted to receive an arc from said first electrode after the arc has moved upwardly in the arc chute to the upper end of said second electrode, said third electrode being connected in shunting relation to said second electrode and said energy dissipating resistor for removing said second electrode and said resistor from the shunt across the capacitors for providing a low resistance shunt across the capacitors to thereby limit the voltage thereacross once the stored energy has been dissipated, and (4) a first reactor connected in series to said first electrode for limiting the fault current flowing across said arc gap upon the establishment of an arc thereacross, (c) a current limiting second reactor connected in said transmission lines in series with each of said sets of capacitors and having an inductive reactance no greater than the capacitive reactance of said set of capacitors in series therewith so that the inductive reactance of said reactor is normally offset by the capacitive reactance of said capacitors, said current limiting second reactor connected to said protective means and being operable in response to the establishment of an arc across said arc gap for cooperating with said first reactor of said protective means for limiting the current flowing in the faulted transmission to a predetermined value, and (d) circuit breaking means connected in said transmission lines in series with said capacitors and connected to each of said protective means for interrupting the faulted circuit in response to current flow through said protective means.

9. In an electrical transmission system having a plurality of transmission lines connected as a transmission network to sources of electrical energy and to loads, said transmission lines having a given basic insulation level which prevents frequent faults therein at a given normal operating voltage; the improvement comprising means for increasing the permissible normal operating voltage impressible on said transmission lines without the necessity of increasing the basic insulation level thereof and for improving the operation of the transmission system comprising (a) a set of capacitors connected in each of said transmission lines at each end thereof, said capacitors serving to substantially offset reactance of the transmission lines and to substantially eliminate voltage dip due to a fault, (b) a transformer for each of said sets of capacitors and having primary and secondary windings, said primary winding of each of said transformers being connected in said transmission lines in series with a set of capacitors, (c) a saturable reactor connected across the secondary winding of each of said transformers, said reactor when saturated serving to impress a short circuit on said transformers and when unsaturated serving to impress an inductive reactance load on said transformer which in turn impresses an increased reactance on said transmission line for limiting current flowing therein to a predetermined value, (d) means connected to each of said transmission lines and to each of said saturable reactors and responsive to normal operating voltage conditions in said transmission lines for saturating said saturable reactor, and (e) protective means connected in shunting relation to each of said sets of capacitors and to each of said reactor saturating means and being inoperative during normal voltage and current conditions in said transmission lines but being operable in response to a predetermined voltage rise across said capacitors due to the occurrence of a fault in the transmission line for shunting said series capacitors and said reactor saturating means to protect said capacitors from damage due to excessive voltage and to render said reactor saturating means inoperable to maintain said reactor saturated so that said saturable reactor becomes unsaturated and remains unsaturated for the duration of the fault in the transmission line.

10. The structure recited in claim 9 wherein said reactor saturating means comprises a second transformer having primary and secondary windings, said primary winding of this second transformer being connected in shunting relation to said set of capacitors, and a rectifier connected to said secondary winding and said saturable reactor.

11. In an electrical transmission system having a plurality of transmission lines connected as a transmission network to sources of electrical energy and to loads, said transmission lines having a given basic insulation level which prevents frequent faults therein at a given normal operating voltage; the improvement comprising means for increasing the permissible normal operating voltage impressible on said transmission lines without the necessity of increasing the basic insulation level thereof and for improving the operation of the transmission system comprising (a) a set of capacitors connected in each of said transmission lines at each end thereof, said capacitors serving to substantially offset reactance of the transmission lines and to substantially eliminate voltage dip occasioned by a fault, (b) a first transformer for each of said sets of capacitors and having a primary winding connected in said transmission line in series with said set of capacitors and a secondary winding operatively associated with said primary winding, (c) a saturable reactor connected across said secondary winding of said transformer and serving when saturated to impress a short circuit on said transformer but serving when unsaturated to impress a reactance load on said transformer to cause said transformer to impress an increased reactance on said transmission line for limiting current flowing therein to a predetermined value, (d) reactor saturating means responsive to normal voltage and current conditions in said transmission line for saturating said saturable reactor comprising (1) a second transformer having a primary winding connected in shunting relation to said set of capacitors and a secondary winding operatively associated with said primary winding, (2) a resistor connected in series with said primary winding of said second transformer, and a rectifier connected to the secondary winding of said second transformer and connected to said saturable reactor so that voltage is impressed on said saturable reactor during normal voltage and current conditions in said transmission line, (e) protective means connected in shunting relation to each of said sets of capacitors and said reactor saturating means and including (1) first and second elongate, spaced apart, upwindly diverging electrodes defining an arc chute therebetween and having the lower portions thereof disposed a predetermined distance apart to define a calibrated arc gap at the lower end of said arc chute which prevents the establishment of an arc thereacross during normal operating voltage conditions in said transmission line but permits an arc to be established in response to a predetermined voltage rise across said arc gap, said first electrode being longer than said second electrode and extending upwardly beyond the upper end of said second electrode, (2) an energy dissipating resistor connected in series with said second electrode on the opposite side thereof from said first electrode for initially dissipating energy stored in the capacitors and the transmission line upon the establishment of an arc across said arc gap, and (3) a third electrode disposed on the opposite side of said second electrode from said first electrode and extending upwardly beyond the upper end of said second electrode for receipt of an arc from said first electrode when the arc has moved upwardly in the arc chute to the upper end of said second electrode, said third electrode being connected in shunting relation to said second electrode and said energy dissipating resistor for removing said second electrode and said resistor from the shunt across the capacitors for providing a lower resistance shunt across the capacitors to thereby limit the voltage thereacross once the stored energy has been dissipated, and (f) circuit breaking means connected in said transmission lines in series with each of said first transformers and responsive to a predetermined rise in current flow in the transmission lines due to a fault therein for interrupting the transmission line to remove the fault therefrom.

12. A protective means for use with capacitors connected in a transmission line or the like for protecting the capacitors from damage due to excessive voltage upon the occurrence of a fault in the transmission line, said protective means comprising (a) means defining a vertically disposed, elongated arc chute adapted to be connected in shunting relation to the capacitors and having an arc gap at the lower portion thereof of sufficient spacing to prevent the establishment of an arc thereacross during normal operating voltage conditions in the transmission line, but permitting the establishment of an arc upon a predetermined voltage rise thereacross to form a shunt across the capacitors, (b) resistance means connected in series with said arc chute for initially impressing a resistance in the shunt across the capaictors for dissipating any energy stored therein, and (c) means operatively associated with said arc chute defining means at the upper portion of said arc chute for receipt of an arc therefrom when the arc has moved upwardly to the upper portion of the arc chute and being connected in shunting relation to said resistance means for removing said resistance means from the shunt across the capacitors to thereby limit the voltage across the capacitors after the energy stored therein has been dissipated.

13. A protective means for use with capacitors connected in a transmission line or the like for protecting the capacitors from damage due to excessive voltage upon the occurrence of a fault in the transmission line, said protective means comprising (a) first and second elongate upwardly diverging electrodes defining an arc chute therebetween and having the lower portions thereof disposed in predetermined spaced relation to define a calibrated arc gap at the lower end of said arc chute, said arc gap preventing the establishment of an arc thereacross during normal operating voltage conditions but permitting the establishment of an arc upon a predetermined voltage rise thereacross, said first and second electrodes being adapted to be connected in shunting relation to the capacitors to define a shunt across the capacitors upon the establishment of an arc across said arc gap, (b) a resistor connected in series with said second electrode on the opposite side thereof from said first electrode for initially impressing a resistance in the shunt across the capacitors for dissipating any energy stored therein, (c) a third electrode disposed in spaced, superposed relation to said first and second electrodes for receipt of an arc from the first electrode upon movement of the arc to the upper portions of said electrodes, and (d) a fourth electrode operatively associated with said third electrode for receipt of an arc therefrom when the third electrode receives the arc from said first electrode, said fourth electrode being connected in shunting relation to said second electrode and said resistor for removing the same from the shunt across the capacitors after movement of the arc to the upper portion of said first and second electrodes for thereby limiting the voltage across the capacitors after the energy stored therein has been dissipated.

References Cited by the Examiner

UNITED STATES PATENTS

| 1,104,733 | 7/1914 | Hunter | 317—9 X |
|---|---|---|---|
| 1,398,982 | 12/1921 | Trittle | 200—147 |
| 1,533,251 | 4/1925 | Johnston | 200—147 |
| 2,401,009 | 5/1946 | Marbury. | |
| 2,547,614 | 4/1951 | Bedford | 323—89 X |
| 2,571,910 | 10/1951 | Marbury et al. | |
| 2,664,525 | 12/1953 | Diebold | 317—12.1 X |
| 2,859,389 | 11/1958 | Diebold. | |
| 2,953,666 | 9/1960 | Mathias | 200—144 X |

FOREIGN PATENTS 1,072,308   3/1954   France.

OTHER REFERENCES

Modern Dictionary of Electronics, Rudolf F. Graf, Howard W. Sams and Company, Inc., Indianapolis 61, Ind., 1962 (pp. 327–328).

MILTON O. HIRSHFIELD, *Primary Examiner.*

SAMUEL BERNSTEIN, STEPHEN W. CAPELLI,
*Examiners.*

R. V. LUPO, *Assistant Examiner.*

UNITED STATES PATENT OFFICE
CERTIFICATE OF CORRECTION

Patent No. 3,274,445                            September 20, 1966

Herman B. Wolf

It is hereby certified that error appears in the above numbered patent requiring correction and that the said Letters Patent should read as corrected below.

Column 1, line 38, for "right-of-way" read -- rights-of-way --; column 6, line 58, for "51" read -- 51' --; column 10, lines 43 to 44, strike out "improving the operation of the transmission system com- of increasing the basic insulation level thereof and for" and insert instead -- of increasing the basic insulation level thereof and for improving the operation of the transmission system com- --; column 11, line 46, for "mean" read -- means --; line 66, for "elongated" read -- elongate --; column 13, line 25, after "winding" insert -- of this second transformer --; line 74, for "upwindly" read -- upwardly --; column 14, line 43, for "elongated" read -- elongate --.

Signed and sealed this 12th day of September 1967.

(SEAL)
Attest:

ERNEST W. SWIDER                            EDWARD J. BRENNER
Attesting Officer                            Commissioner of Patents